United States Patent [19]

Asakura

[11] Patent Number: 5,059,265
[45] Date of Patent: Oct. 22, 1991

[54] METHOD OF CONTROLLING THICKNESS OF ORIENTED RESIN FILM

[75] Inventor: Takaaki Asakura, Kashima, Japan

[73] Assignee: Oji Yuka Goseishi Co., Ltd., Tokyo, Japan

[21] Appl. No.: 457,832

[22] Filed: Dec. 27, 1989

[30] Foreign Application Priority Data

Dec. 29, 1988 [JP] Japan .................. 63-334868

[51] Int. Cl.$^5$ .............. B29C 47/06; B29C 47/92; B32B 31/30
[52] U.S. Cl. ................................. 156/64; 156/164; 156/244.11; 264/40.1; 264/40.6; 264/171; 264/210.6; 264/210.7; 264/211; 264/290.2; 364/473; 364/563
[58] Field of Search ............... 264/401.1, 40.2, 40.6, 264/171, 210.6, 210.7, 211, 290.2; 425/141, 466; 156/64, 244.11, 244.24; 364/473, 476, 563

[56] References Cited

U.S. PATENT DOCUMENTS 3,782,873 1/1974 Lynnknowles .................. 425/141

FOREIGN PATENT DOCUMENTS 46-40794 12/1971 Japan .
61-149343 7/1986 Japan .
63-50179 10/1988 Japan .

OTHER PUBLICATIONS

English-Language Translation of Japanese Reference 63-50, 179.

Primary Examiner—Leo B. Tentoni
Attorney, Agent, or Firm—Oblon, Spivak, McClelland, Maier & Neustadt

[57] ABSTRACT

The thickness of a biaxially oriented resin film is controlled by reading the thickness distribution of the oriented resin film prior to rolling up thereof and separating the readings into modes by harmonic analysis (Fourier transformation) using a computer. The modes are then divided into modes of a low frequency component and a high frequency components by a predetermined border mode. The deviation is controlled in the profile of the low frequency component by adjusting die bolts as well as controlling the deviation in the profile of the high frequency component by regulating temperatures of a number of heater elements in an oven.

6 Claims, 6 Drawing Sheets

METHOD OF CONTROLLING THICKNESS OF ORIENTED RESIN FILM

BACKGROUND OF THE INVENTION

1. Field of the Invention

This invention relates to a method of controlling the thickness of oriented resin film, and in particular, for preparing biaxially oriented thermoplastic resin films such as a biaxially oriented polypropylene film, a biaxially oriented polyester film, a synthetic paper composed of oriented resin film containing inorganic filler (refer to, for example, Japanese Patent Publication No. 40794/1971), a shrink film and the like. This invention further relates to a method of controlling the thickness of oriented resin film to manufacture a uniform thickness of oriented resin film by controlling nonuniformity in thickness in a transverse direction of the biaxially oriented resin films.

2. Discussion of the Background

Conventionally, a slide lip type T-die is designed so that its lip gap can be adjusted by moving the slide lip along the sliding face of the movable die by using a plurality of gap adjustment die bolts attached transversely to the die (refer to Japanese Patent Publication No. 50179/1988). However, after transverse orientation, the theoretically minimum wavelength on a thickness distribution profile, adjustable by the bolts, is at least two times the product of the mounting pitch between the bolts and the transverse stretching ratio.

Here, the thickness distribution profile is an approximation of a profile of a periodic function (Fourier Series) with a period of $2\pi$, having the formula $$f(x) \approx \frac{a_0}{2} + \sum_{i=1}^{N} (a \cos ix + b \sin ix)$$

which is obtained by a harmonic analysis (Fourier transformation) of the thickness distribution of the biaxially oriented film. Further, the wavelength means the product of the film width and the period of the wave (nonuniform thickness) divided by $2\pi$.

The slide lip extends transversely integrally; therefore, even when only a particular bolt is adjusted among the plurality of thickness adjusting bolts, not only the lip gap around the adjusted bolt varies but also the lip gaps around the other bolts will be effected by the adjustment. Accordingly, in practice, the adjustable wavelength tends to become longer than that expected. Such a limitation phenomenon commonly occurs regardless of manual or automatic lip gap adjustment. Therefore, such adjustment of the transverse thickness distribution at the T-die naturally has its limitations.

On the other hand, for overcoming this limitation when adjusting the transverse thickness of biaxially oriented resin film at a T-die, a method of controlling the thickness of oriented resin film for reducing thickness nonuniformity is also known (refer to Japanese Patent Laid-open No. 149343/1986), which comprises independently regulating the temperatures of the plural heaters set in a tentering or annealing oven along the oriented resin film in its transverse direction during the film production, thereby controlling the temperature of hot air to be sprayed to the oriented resin film.

Methods of controlling the thickness of biaxially oriented resin film have been investigated, and they comprise combining controlling the thickness by regulating the temperatures of the heater elements and controlling the thickness by regulating lip gap. However, the synergistic effect of both methods produces hunting, which resulting in the thickness distribution of biaxially oriented resin film being manually controlled based on experience as the only method, automatic control based on the combination of thickness controlling methods comprising regulating the temperatures of the heater elements as well as die lip gap never having been conducted.

As a result of the present inventors earnestly investigating these problems, the automatization of thickness control of oriented resin film has been made possible by reading the thickness distribution of the oriented resin film prior to rolling up thereof; separating the readings into modes by means of harmonic analysis (Fourier transformation) using a computer; dividing the modes into two groups of a low frequency component and a high frequency component by a predetermined border mode; and controlling deviation in the profile of the low frequency component by solely regulating to what degree the thickness-adjusting die bolts are tightened as well as controlling deviation in the profile of the high frequency component by solely regulating the temperatures of plural heater elements in an oven.

SUMMARY OF THE INVENTION

Accordingly, one object of the present invention is to set forth a method of uniformly controlling the thickness of a biaxially oriented resin film.

In a preferred embodiment, the present invention comprises melt-extruding a resin into a sheet through a die, orientating the sheet along a machine direction by means of circumferential velocity differential among rolls, and transversely orientating the resulting sheet by means of a tenter. The thickness of the sheet is then controlled by regulating to what degree the thickness-adjusting die bolts are tightened as well as the temperatures of a plurality of heater elements set in a tentering oven. The method of controlling the thickness of oriented resin film is characterized in that the thickness of the biaxially oriented resin film along a transverse direction is measured, and the results are being separated into mode components (1 to N) by harmonic analysis (Fourier transformation) of the distribution of the thickness using a computer. The thickness distribution is approximated to the profile of a periodic function with a period of $2\pi$ of the formula:

$$f(x) \approx \frac{a_0}{2} + \sum_{i=1}^{N} (a \cos ix + b \sin ix)$$

then dividing the mode component (1 to N) into low frequency components (1 to x) and high frequency components (x+1 to N) by a border of mode (x) previously specified in a computer. The nonuniform thickness on the profile of the low frequency components is then controlled by regulating to what degree the thickness-adjusting die bolts are tightened as well as the nonuniform thickness on the profile of the high frequency components being controlled by the regulation of temperatures of the heater elements in the tentering oven.

The term "mode" means a wave having a wavelength which is the quotient of the width of a biaxially oriented resin film divided by a natural number.
Where, N is at least 5.
X is at least 2, less than N and not more than Y.

Y is a value calculated according to the formula $$\frac{[\text{width of biaxially oriented resin film (mm)}]}{\left(\begin{array}{c}\text{distance between thickness}\\\text{adjustment bolts (mm)}\end{array}\right) \times \text{transverse orientation ratio}}$$

The following is a list of all reference numbers used in the above drawings.

I: extrusion process, II: machine direction orientation process, III: laminating process, IV: transverse orientation process, V: take-up process, 1: substrate sheet, 2: longitudinally oriented sheet, 3,4: surface and back laminated layers, 5: resin film, 6: oriented resin film, 7: extruder, 8: die, 9: fixed lip, 10: sliding lip, 11: thickness-adjusting die bolt, 12: motor, 13: die of movable side, 14: sliding surface, 15: die lip gap, 16: rolls, 17: thickness gauge, 18: calculation apparatus for harmonic analysis, 19: high frequency component, 20: low frequency component, 19a, 19b; nonuniform thickness of high frequency component, 20a, 20b; nonuniform thickness of low frequency component, 21, 22: extruder, 23, 24; die, 26a: tentering oven, 26b: annealing oven, 27a, 27b: heater for plenum duct, 28a, 28b: heater element, 29: tenter, 30: burr, 31: controlling device for thickness-adjusting die bolt, 32: controlling device for heater element, 33: presetting part for target sheet thickness, 34: arithmetic logic unit (ALU) for harmonic analysis, 35: ALU for the heating temperature of heater element, 36: ALU for manipulating variable of thickness-adjusting die bolt

DETAILED DESCRIPTION OF THE INVENTION

The method of controlling the thickness of oriented resin film of this invention will be concretely illustrated with reference to the following drawings.

Figure 1:
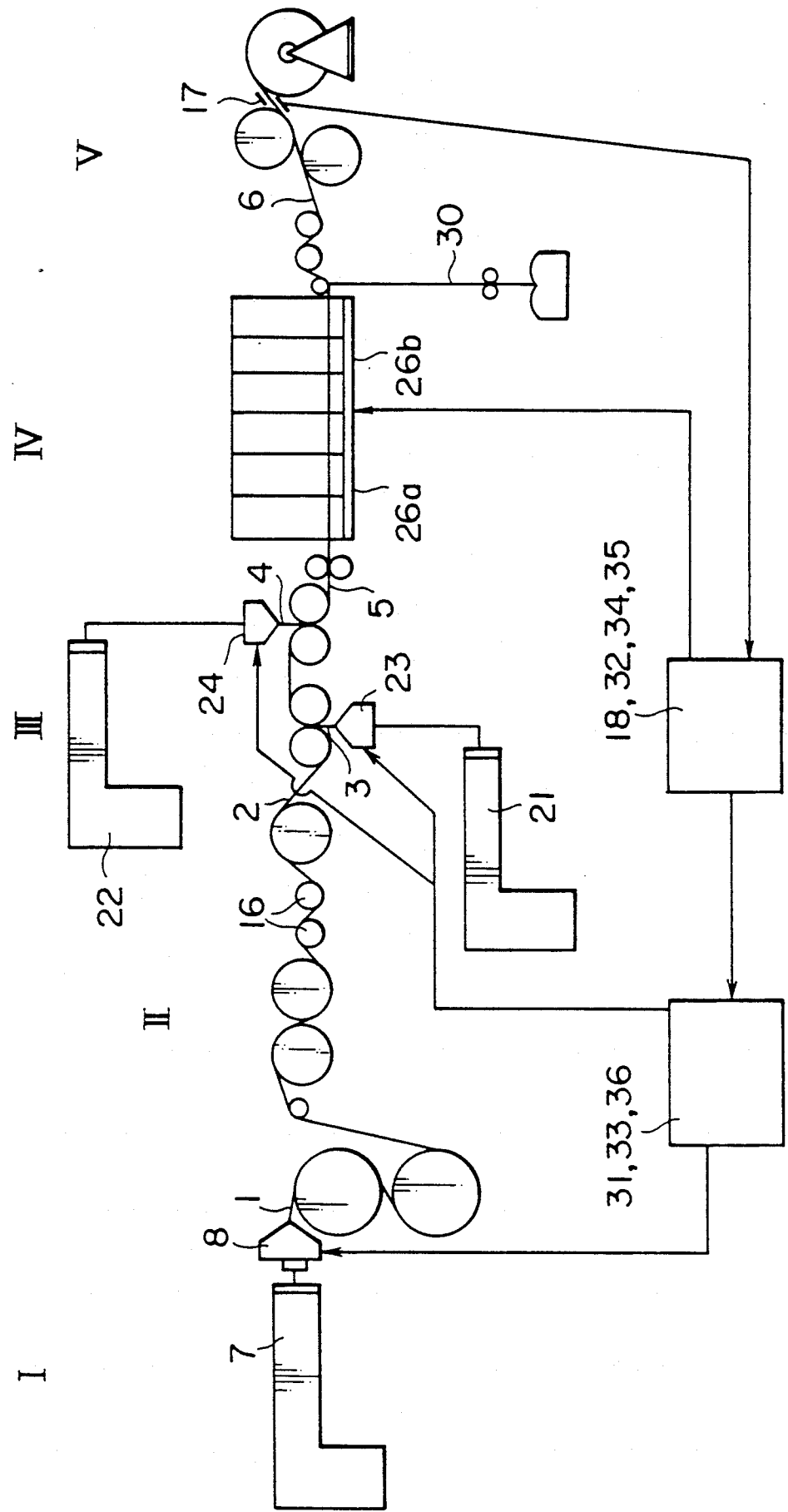
FIG. 1 is a schematic illustration of a manufacturing apparatus for oriented resin film used in the examples of this invention.

FIG. 1 is a schematic illustration of a manufacturing apparatus for an oriented resin film having a laminated structure which shows an example of the present invention.

The manufacturing process for an oriented resin film is substantially composed of an extruding process I to form a substrate sheet through the die; a machine direction orientation process II to orientate the sheet longitudinally by the use of the circumferential velocity differential among rolls; a transverse orientation process IV to transversely orientate the longitudinally oriented sheet 2, which is oriented by the machine direction orientation; and a rolling-up process V to roll up the biaxially oriented film 6 obtained by the preceding processes. If necessary, as shown in FIG. 1, a laminating process III to laminate each of the surface and back laminate layers 3, 4 onto the substrate layer of the longitudinally oriented sheet 2 can be installed between the extrusion process I and the machine direction orientation process II, or between the machine direction orientation process II and the transverse orientation process III.

Extrusion process I

The extrusion process I forms the substrate sheet 1 in the following manner. First, after melt kneading a thermoplastic resin or a composition comprising inorganic fine powder and antioxidant, when required, by using the extruder 7, the resulting compound is extruded into a sheet through the die lip attached to the extruder 7 at the tip.

Figure 2:
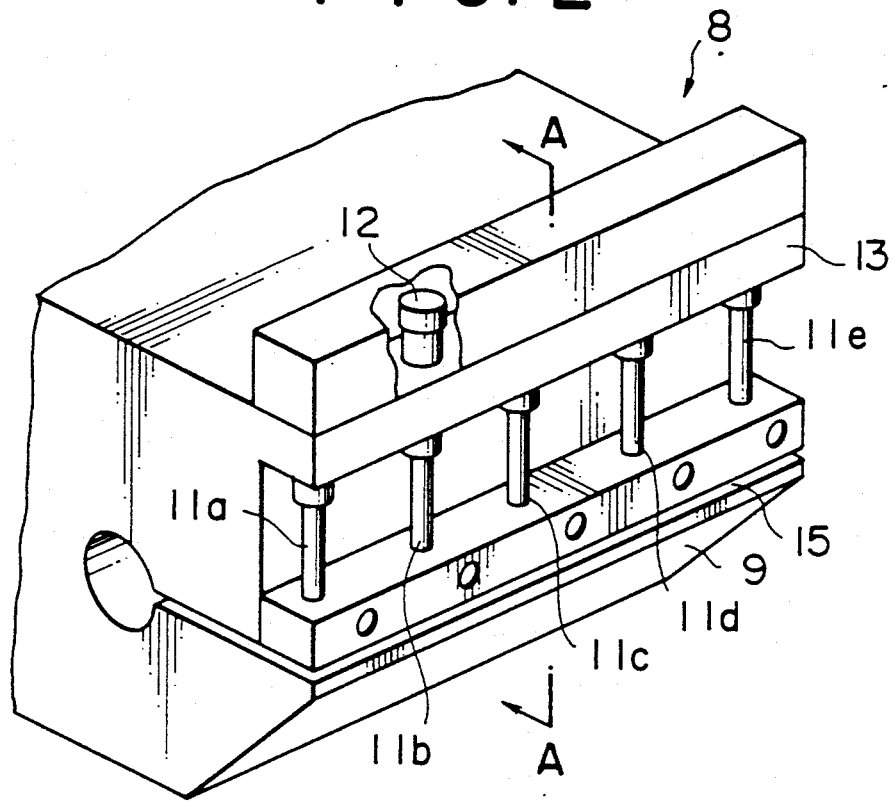
FIG. 2 is a perspective view of a slide type of T-die.
Figure 3:
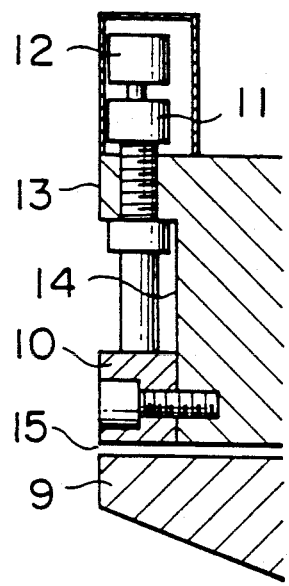
FIG. 3 is a sectional view along section line A—A of FIG. 2.

Adjustment of the thickness of the substrate sheet 1 is conducted, as shown by the perspective and sectional views of the slide type of T-die 8 in FIGS. 2 and 3, respectively, by controlling the die lip gap 15 by moving the sliding lip 1 against the fixed lip 9 along the sliding surface 14 of the die of movable side 13 by tightening a plurality of thickness-adjusting die bolts 11 manually or by motor drive 12, which is attached to the sliding lip 10.

Machine direction orientation process II

Then, the substrate sheet 1 is led to the machine direction orientation process II, and then after heating the sheet, usually at a temperature under its melting temperature but at a temperature that is suitable for orientation, the sheet is oriented longitudinally by the use of the circumferential velocity differential among rolls 16.

Laminating process III

The laminating process III is, if needed, applied to one or both sides of a non-oriented substrate sheet or a longitudinally oriented sheet. That is, after melt-kneading thermoplastic using, for example, two extruders 21 and 22, surface and back laminate layers 3 and 4 are extruded through the dies 23 and 24 attached to the tips of the extruders onto the substrate film, leading them to the laminating process III. Herein the two layers are laminated independently to the surface and the back surface of the sheet 2 to obtain a three-layer structure of laminated film 5. As for such lamination, both the surface and the back surface of the substrate sheet 1 can be laminated with at least two layers respectively, resulting in a five-layer structure of laminated film.

Transverse orientation process IV

Figure 4:
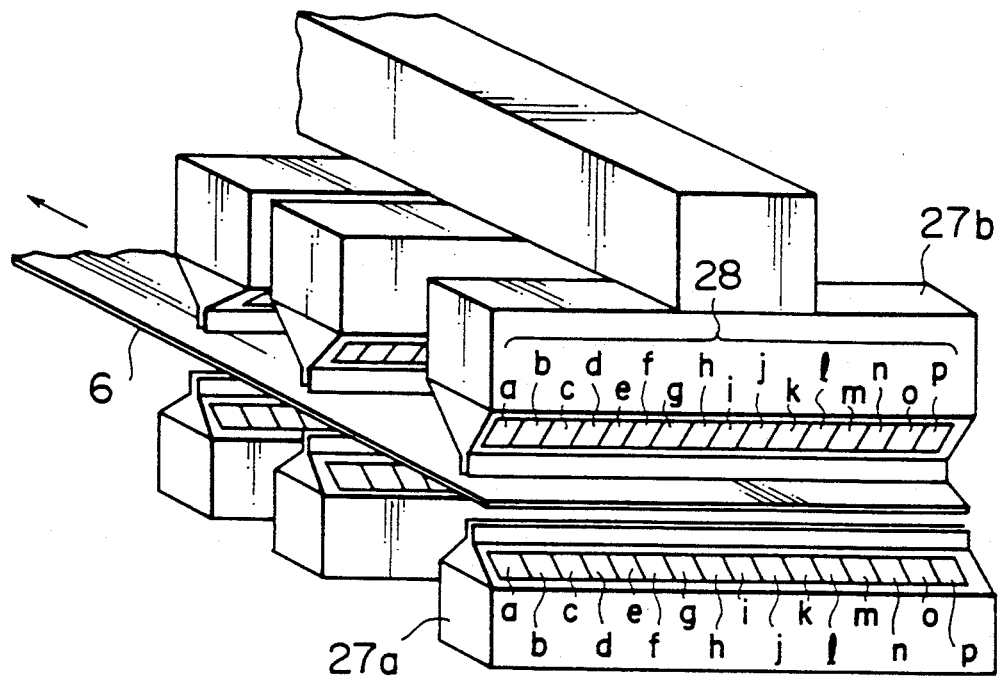
FIG. 4 is a perspective view of the heaters for inner plenum ducts of a tenter oven.
Figure 5:
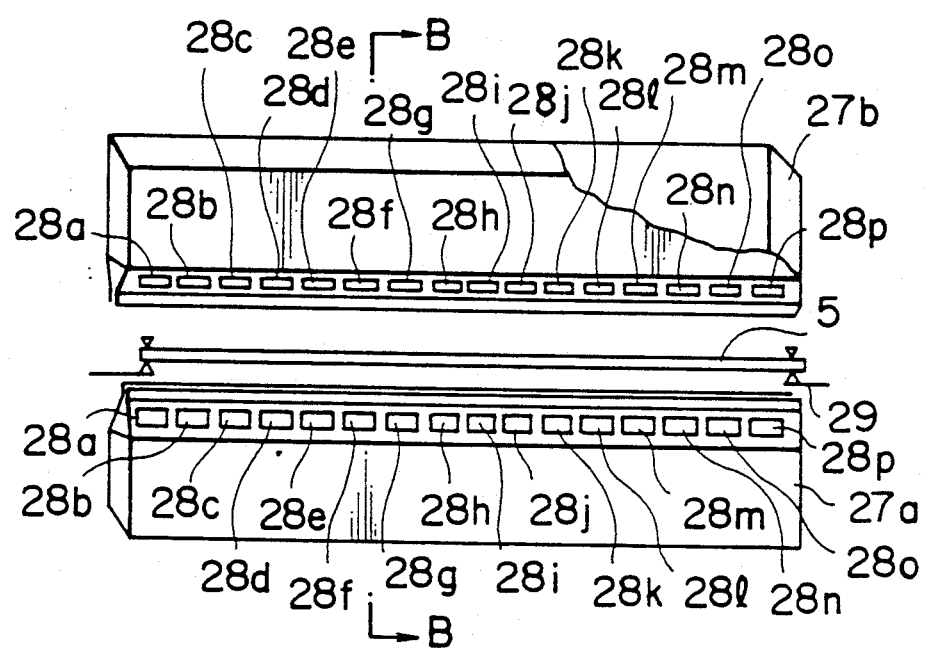
FIG. 5 is a front view of a plenum duct.
Figure 6:
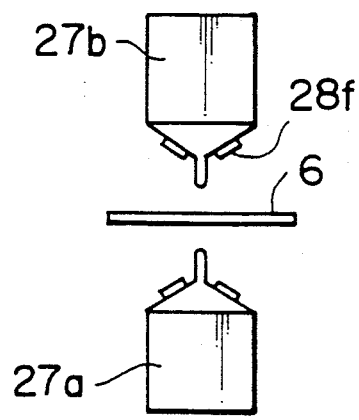
FIG. 6 is a sectional view along section lines B—B of FIG. 5.
Figure 7:
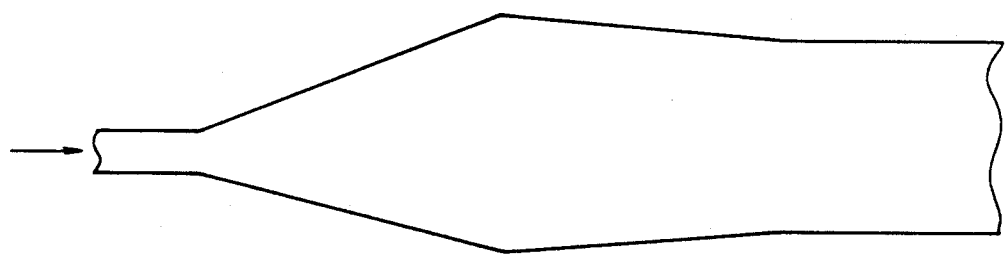
FIG. 7 is a shape of an oriented resin film under orientation in a transverse orientation process.

The laminated film 5 is then led into the tentering oven 26a in the transverse orientation process IV. Further, as shown in FIGS. 4 and 5, film 5 is led into the gap between the heaters 27a and 27b for the plenum duct which are arranged at both upper and lower sides of the film and in a transverse direction. Film 5 is heated up to temperatures suitable for orientation using hot air heated by the heater elements 28a–28p attached to the each of heaters 27a and 27b for the plenum duct. The film is oriented to have the shape of a film as shown in FIG. 7 by using the tenter 29 for the production of the oriented resin film 6.

Further, as shown in FIG. 4, this oriented film 6 is led to the annealing oven 26b, wherein the film is usually heated to temperatures near the melting temperature of a resin to be heat-set by allowing the film to pass through the gap between the heaters 27a and 27b for the plenum ducts which are arranged at both upper and lower sides of the film.

Rolling-up process V

After, the burrs of the both edges of the heat-set oriented resin film 6 are removed by slitting with knives, etc. in the rolling-up process. The thickness distribution of the oriented resin film 6 is then measured in a transverse direction with a thickness gauge 17 such as a beta-ray gauge at specific intervals and the measured data is sent to the computer 18 by communication for harmonic analysis (Fourier transformation). The results are also separated into a low frequency component and a high frequency component.

In FIG. 1, a computer is composed of an ALU for harmonic analysis 18, a controlling device for-thickness adjustment die bolt 31, a controlling device for heater element 32, a presetting part for target sheet thickness 33, an ALU for harmonic analysis 34, an ALU for the heating temperature of heater element 35, and an ALU for manipulating the variables of thickness-adjusting die bolt 36.

(Method of adjusting thickness)

If the thickness distribution (FIG. 11) of the film 6 is a function of f(x) having a period of $2\pi$, it is expressed by the formula $$f(x) \approx \frac{a_o}{2} + \sum_{i=1}^{N} (a \cos ix + b \sin ix) \quad (1)$$

wherein, i is mode number, ai and bi are the amplitude of the mode i, and the term "mode" means a wave having a wavelength being the quotient of the width of the oriented resin film divided by a natural number.

Figure 11:
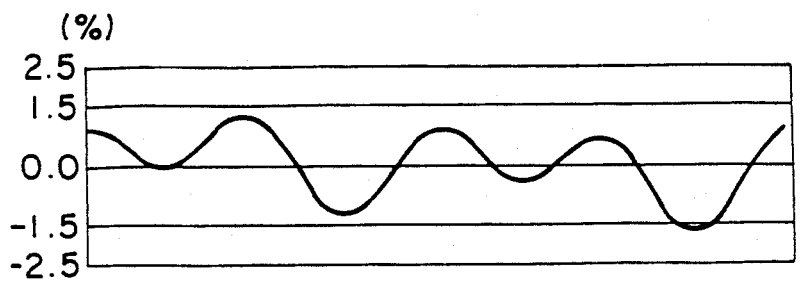
FIG. 11 is thickness distribution of a film.
Figure 12A:
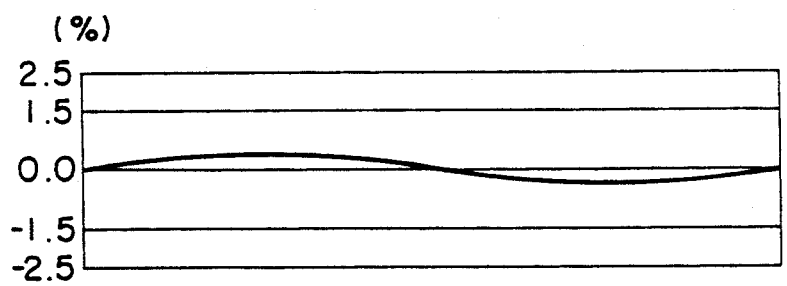
FIGS. 12(a) to 12(c) are obtained by breaking down the thickness distribution of the film shown in FIG. 11 into three harmonic functions of mode.
Figure 12B:
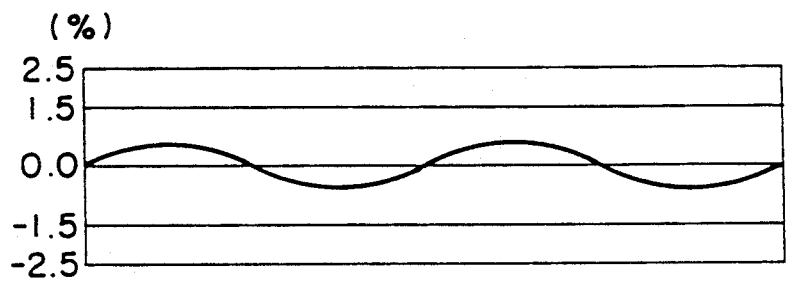
Figure 12C:
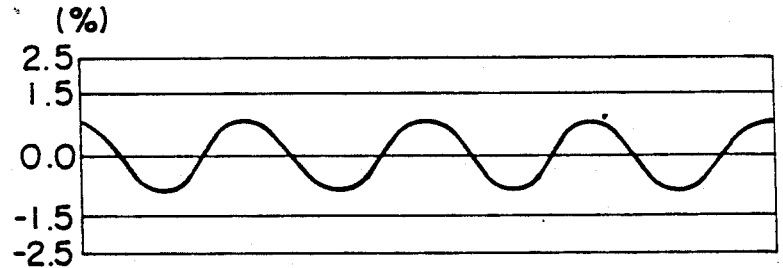

For example, if mode N is 4, the thickness distribution of a film shown by FIG. 11 (the overall width is T) can be approximated by the sum of the harmonic functions expressed by (a), (b) and (c) shown in FIG. 12. The wavelengths of (a), (b) and (c) are T, T/2 and T/4, respectively.

Figure 8:
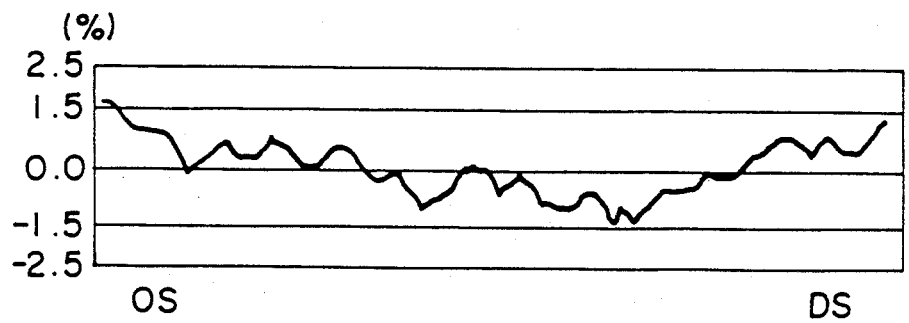
FIG. 8 is an example of a graph of thickness distribution of oriented film.

FIG. 8 shows a thickness distribution in a transverse direction obtained by measuring the thickness of the oriented film 6 having a width of 3300 mm with the beta-ray gauge 17 at 110 points spaced at intervals of about 30 mm.

In this invention, adjustment of thickness distribution is conducted by allowing the adjustment to be allotted to the adjusting die bolts and the heater elements in the tentering oven.

Some biaxial orientation apparatuses employ an automatic adjusting die (an automatic adjusting device for the die lip gap). However, a theoretically minimum controllable wavelength of nonuniform thickness is at least two times as long as the distance between thickness-adjusting bolts (after transverse orientation, the product of the distance value and the transverse orientation ratio is employed), and therefore, this automatic adjustment is substantially identical with manual adjustment.

For the purpose of shortening adjustable wavelength, a decrease in the distance between the thickness adjusting bolts of the die was tried, but this method is ineffective because in practice the lip of the die is a continuum and has limited flexibility.

On the other hand, the adjustment of nonuniform thickness with the heater elements in the tentering oven is conducted in the heat-set zone in the tentering oven, and it is therefore possible to make the theoretically minimum controllable wavelength not more than ½ compared with the automatic die. However, when a great degree of adjustment is applied, the thermal distributions of the heat elements interact with each other resulting in extreme heat-set distributions as well as disadvantages impairing other properties.

In other words, the adjustment of thickness-adjustment bolts (automatic or manual adjustment) is suitable for rough adjustment (low frequency components) and the adjustment of heater elements in a tentering oven is suitable for fine adjustment (high frequency components).

However, when both of these two methods of controlling thickness distribution are used for the automatic control of a profile, the objects to be controlled have quite the same thickness distribution profile, so that a system designed without considering the interrelation between the two methods will provide a profile with hunting due to the influence of the both methods resulting in poor results.

In the present invention, in order to avoid hunting by making use of the advantages of the two adjusting methods, harmonic analysis (Fourier transformation) is employed, and the low frequency component in the profile is adjusted by controlling the lip gap using the thickness adjusting bolts of the die and the high frequency component is adjusted by controlling the temperatures of the heater elements in the tentering oven.

That is, the transverse thickness distribution, as shown in FIG. 8, is measured with a beta-ray gauge. Then, the results are subjected to harmonic analysis (Fourier transformation) using a computer to be approximated as the sum of harmonic functions having modes of 1 to N.

The sum is divided into a low frequency component having modes of 1 to x [formula (2) below] and a high frequency component having modes of x+1 to N [formula (3) below].

$$f(x1) \approx \frac{a_o}{2} + \sum_{i=1}^{X} (a \cos ix + b \sin ix) \quad (2)$$

$$f(x2) \approx \frac{a_o}{2} + \sum_{i=x+1}^{N} (a \cos ix + b \sin ix) \quad (3)$$

Figure 10:
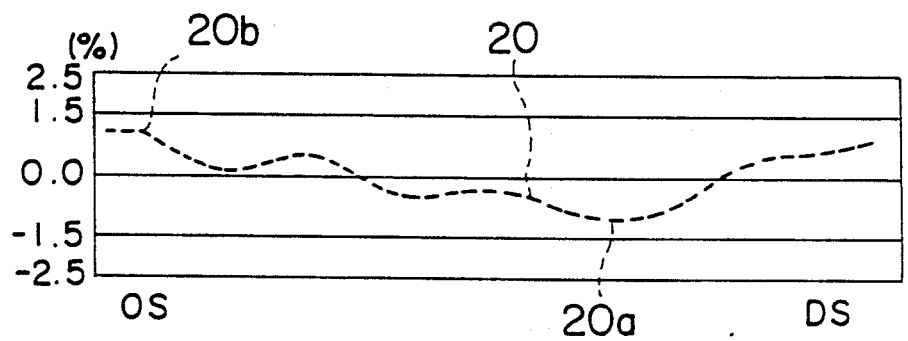
FIG. 10 is a graph of low frequency component.

According to the profile of the low frequency component, the adjustment of film thickness is conducted by calculating the manipulating variable of the die bolt 11 with the controlling device for thickness adjustment of die bolt 31. Increasing or decreasing the die lip gap 15 by adjusting the degree of tightening of the corresponding die bolt is then effectuated according to the output signals from the device 31. For example, when the nonuniform thickness is of a negative % as shown at the part 20a in FIG. 10, the adjustment of the part 20a is performed by increasing the die lip gap by loosening the degree of tightening of the bolt lid. And, when the nonuniform thickness is a positive %, as shown at 20b in FIG. 10, the die lip gap is decreased by tightening the degree of tightening of the bolt 11a.

Figure 9:
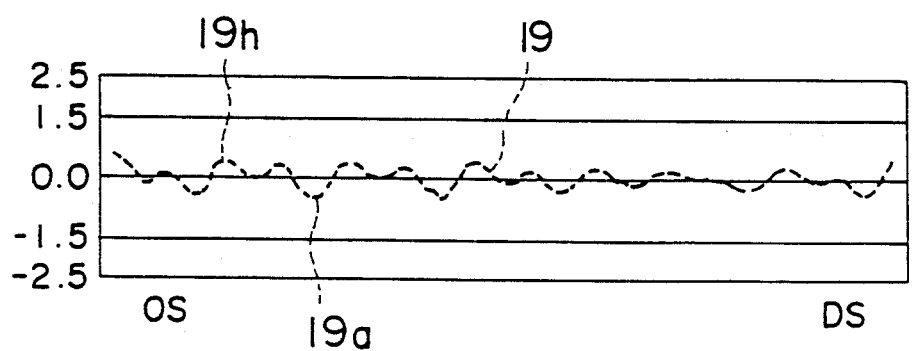
FIG. 9 is a graph of high frequency component.

For the high frequency component, the thickness-adjustment of the film is performed by increasing or decreasing the heating temperatures of the corresponding heater elements of 28a, 28b,—28p in the plenum duct with the controlling device for heater element 32. When, for example, the nonuniform thickness is of a positive % as shown at 19h in FIG. 9, the heating temperature of the heater element 28c is raised, and when the nonuniform thickness is of a negative % as shown at 19a in FIG. 9, the heating temperature of the heater element 28c is lowered.

The mode number N is at least 5 or more, preferably more than 14, the upper limit x for the low frequency component is more than 1 and not more than Y, and preferably ranges from 3 to 5, wherein, Y is a value calculated by the following formula:

$$\left( \frac{\text{[width of biaxially oriented resin film (mm)]}}{\text{distance between thickness adjustment bolts (mm)}} \right) \times \text{transverse orientation ratio}$$

When multi-layer laminated film is produced by using a plurality of dies, it is necessary to distribute low frequency components to the dies. The manipulating variable of each die, Di, is the product of the nonuniform thickness of the low frequency components of the total layers T μm (manipulating variable of the total layers) and the distribution ratio Ci.

That is:

$$Di = T \times Ci \quad (\mu m)$$

where, Ci is expressed by $$Ci = \frac{ti}{\Sigma ti}$$

(ti: thickness of each layer), and $0 \leq Ci \leq 1$ and $\Sigma Ci = 1$. It is preferable that Ci has a value near that of thickness constituting ratio.

EXAMPLES

Methods of controlling the thickness of oriented resin film according to this invention are illustrated with reference to the following examples, but the invention is not intended to be limited only to these following examples.

EXAMPLE 1

Using an apparatus for manufacturing oriented resin film which has a thickness controlling device for oriented resin film as shown in FIG. 1, an oriented resin film having a transverse width of 3300 mm was prepared.

After melt kneading a composition comprising 90 parts by wt. of polypropylene (Trade name: Mitsubishi Noblen MA-6, made by Mitsubishi Petrochemical Co., Ltd.), 10 parts by wt. of high-density polyethylene (Trade name: Yukalon Hard EY-40, made by Mitsubishi Petrochemical.Co., Ltd.), 15 parts by wt. of inorganic fine powder and 0.3 parts by wt. of antioxidant by using extruder 7. The resulting compound was extruded into a sheet at 200° C. through the die 8 attached to the tip of the extruder 7 with the die lip gap 15 adjusted to be of about 3 mm by means of thickness-adjusting bolts 11a,—11e (the distance between the bolts was about 66 mm).

After leading this sheet to the machine direction orientation process II to be heated at about 135° C., the sheet was oriented longitudinally to be 4 times as long as that before being stretched by using circumferential velocity differential among rolls 16.

Then, after once cooling the film 5 down to a temperature 20° C. higher than room temperature, the film was led into the tentering oven 26a and heated to about 170° C. to orient the film transversely to be about 10 times as long as before being stretched.

Heater elements 28a, 28b attached to the plenum duct in the tentering oven are then ready for working if needed.

Using the biaxial orientation apparatus, three types of controlling methods for a uniform thickness distribution were carried out in the manner as shown in TABLE 1.

TABLE 1

| | average thickness | nonuniformity of thickness % | controlling method of thickness distribution |
|---|---|---|---|
| EXAMPLE | 130 μm | ±1.0 | controlling method of this invention *1 |
| COMPARATIVE EXAMPLE 1 | 129 μm | ±3.1 | only adjustment of die thickness-adjusting bolt |
| COMPARATIVE EXAMPLE 2 | 131 μm | ±2.2 | die thickness-adjusting bolt + heater *2 |

*1: N = 25, x = 5
*2: No harmonic analysis was conducted, the thickness distribution measured by a beta-ray gauge was directly communicated to automatic thickness-adjusting die bolts and the heater elements to control them independently.

In the present invention a thickness control of oriented resin film is carried out by conducting harmonic analysis of the thickness distribution measured and dividing the waveform into two parts, a high frequency component and a low frequency component. The nonuniform thickness of the low frequency component is controlled by adjusting die bolts and the nonuniform thickness of the high frequency component is controlled by adjusting heater temperature. The thickness controlling method permits the production of an oriented resin film, having an extremely uniform thickness distribution, such as a biaxially oriented polypropylene film, a biaxially oriented polyester film, synthetic paper, a shrink film and the like.

What is claimed is:

1. In a method of uniformly controlling a thickness of a biaxially oriented resin film comprising the steps of:
   melt-extruding a resin into a sheet through a die;
   orienting the sheet in a machine direction by means of circumferential velocity differential among rolls, thereby generating a resulting resin film;
   orienting the resulting resin film transversely by means of a tenter and directing the resin film into a tentering oven, thereby generating the biaxially oriented resin film;
   controlling the thickness of said biaxially oriented resin film by regulating a degree of tightening of thickness-adjusting die bolts as well as temperatures of a number of heater elements set in the tentering oven,
   wherein said thickness of the biaxially oriented resin film is controlled by measuring the thickness of the biaxially oriented resin film along a transverse direction, the results of said measurement being separated into mode components by harmonic analysis of a distribution of said thickness using a computer, wherein the thickness distribution is approximated to a profile of a periodic function with a period of $2\pi$ of the formula $$f(x) \approx \frac{a_0}{2} + \sum_{i=1}^{N} (a_i \cos ix + b_i \sin ix)$$

mode components (1 to N) of the periodic function are then divided into low frequency components (1 to x) and high frequency components (x+1 to N) by border of mode (x) previously specified in a computer, wherein a nonuniform thickness of said biaxially oriented resin film is controlled on a profile of low frequency components by regulating a degree to which the thickness-adjusting die bolt are tightened as well the nonuniform thickness being controlled on a profile of high frequency components by a regulation of temperatures of the heater elements in the tentering oven, wherein, the term "mode" is a quotient of a width of biaxially oriented resin film divided by a wave length, where, N is at least 5, X is at least 2, less than N and not more than Y, Y is a value calculated according to the formula $$\frac{[\text{width of biaxially oriented resin film (mm)}]}{\left(\begin{array}{c}\text{distance between thickness}\\ \text{adjustment bolts (mm)}\end{array}\right) \times \text{transverse orientation ratio}}$$

2. A method according to claim 1 wherein the mode number N is at least 5, and X is 3 to 5.

3. A method according to claim 1 wherein the oriented resin film comprises polypropylene, polyethylene, or a mixture thereof.

4. A method according to claim 3 wherein the oriented resin film comprises inorganic fine powder.

5. A method according to any one of claims 1 to 4 wherein a melt resin film is further laminated on one side of a longitudinally oriented film.

6. A method according to any one of claims 1 to 4 wherein a melt resin film is further laminated on both sides of a longitudinally oriented film.

* * * * *